Jan. 13, 1970      J. R. TRICE, JR      3,488,854

GRADE SETTING AND LEVELING DEVICE

Filed Feb. 8, 1968      2 Sheets-Sheet 1

INVENTOR.
JAMES R. TRICE JR.

BY

ATTORNEYS

United States Patent Office 3,488,854
Patented Jan. 13, 1970

3,488,854
GRADE SETTING AND LEVELING DEVICE
James R. Trice, Jr., Arlington County, Va., assignor to Contractors Automated Devices Incorporated, Arlington, Va., a corporation of Delaware
Filed Feb. 8, 1968, Ser. No. 704,127
Int. Cl. G01c 15/12
U.S. Cl. 33—46                                17 Claims

ABSTRACT OF THE DISCLOSURE

This disclosure relates to a grade setting device used, for example, for a collimated light source for aligning and setting of sewer pipes by the method disclosed and claimed in U.S. Patent No. 3,116,557. The device has a housing so shaped as to be positioned on a light source.

A rotatable platform with a level indicating means is positioned in the housing means and means are provided to adjust the relationship between the platform and the housing. A meter is provided to indicate the grade at which the device is set relative to a horizontal plane.

---

In my U.S. Patent No. 3,116,557, there is disclosed and claimed a method for laying sewer pipes wherein a collimated light source and target is employed. In this system, the light beam must be pre-aligned to insure proper placement of the pipes.

This application deals with a device which can be used to align the light source, for example, to be employed in the method of my Patent No. 3,116,557.

Blount et al., 3,279,070 discloses a grade setting device which is attached to a light beam projecting device holder. The grade setting device consists of a platform, rotatable about one end, a level, a rod and spring to bias the platform downwardly and a micrometer projecting through the platform contacting the holder to force the platform upwardly. The platform angle can be adjusted by turning the micrometer to change the position of the micrometer rod relative to the light box holder. The micrometer rod has a square end which contacts the holder. As long as the platform is approximately parallel to the holder, the grade indicated by the micrometer remains relatively accurate. However, due to the squareness of the end of the micrometer rod, the accuracy diminishes as the grade increases. Further, the micrometer rod is difficult to read.

I have now discovered an improved grade setting device which employs a pivotable platform and rod to adjust the position of the platform relative to a light beam wherein the adjusting device is connected to a meter which is easily calibrated and the grade is easily read on the meter and the rod has a rounded end to maintain accuracy of the device with increasing grade.

By various aspects of this invention, one or more of the following, or other objects can be obtained.

It is an object of this invention to provide a device for aligning a light beam along a predetermined path.

It is a further object of this invention to provide a grade setting device for accurately setting the grade on a light beam regardless of the degree of grade.

It is a further object of this invention to provide a device for accurately determining the grade or dip of a light beam.

It is a further object of this invention to provide a device for accurately setting a grade on an alignment device.

It is a further object of this invention to provide an accurate grade setting device which has a meter which is linearly related to grade to indicate the grade set by the device.

Other aspects, objects, and the several advantages of this invention are apparent to one skilled in the art from a study of this disclosure, the drawings, and the appended claims.

According to the invention there is provided a grade setting and leveling device. The device contains a housing, a platform attached at one end to the housing and pivotal about the end with respect to the housing, a level indicating means on the platform, and a means for adjusting the rotational position of the platform relative to the housing. The adjusting means is so shaped that the accuracy of the device is constant regardless of grade. Meter means are also provided to indicate the grade of a light with respect to a horizontal plane.

Preferably, the device also contains a sighting means for aligning a collimated light source with a target by means of a grade box.

Preferably, the device is used for setting grade for a collimated light beam projector which is most preferably a laser beam.

The invention will now be described with reference to the accompanying drawings in which.

Figure 1:
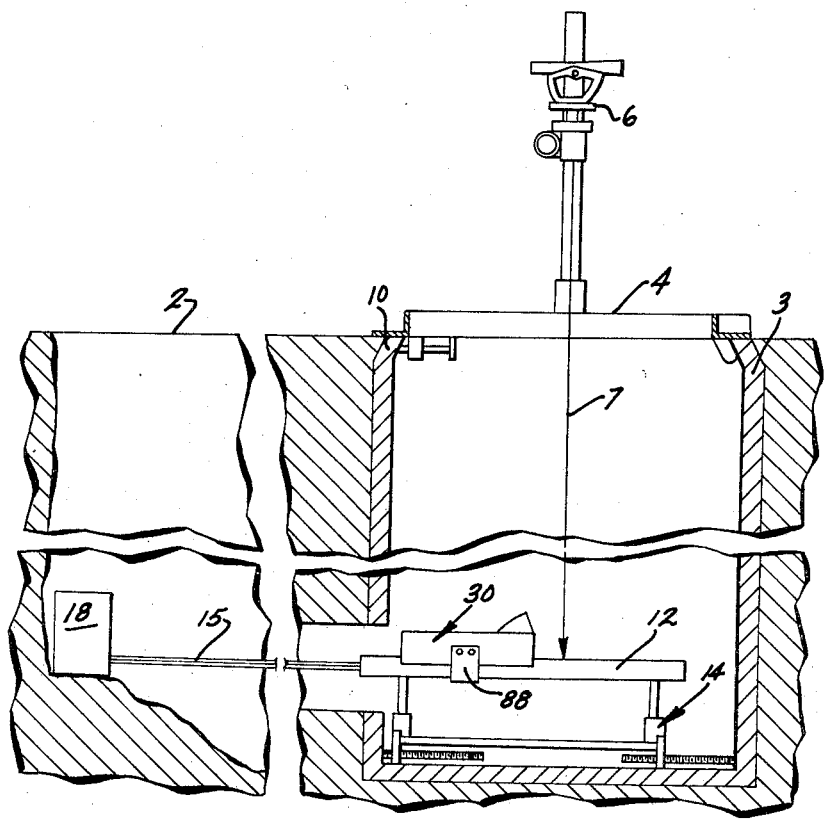
FIG. 1 is a schematic elevational representation of the system in which the invention is employed.

Referring now to the drawings, and in particular to FIG. 1, a ground surface 2 is cut away in part and a manhole 3 is accurately positioned therein. A transit 6 is supported on a supporting device 4 above the manhole top 10. A vertical plumb line 7 extends vertically downwardly from the transit 6 a predetermined distance depending upon the desired depth of the pipe to be positioned. A collimated light source such as a laser beam generating device 12 is supported in the bottom of the manhole on a support 14. The laser supporting device has means for coarsely and finely adjusting either end of the laser generating device 12. The collimated light beam from the light source 12 travels along a predetermined path 15 such as along the centerline of a pipeline 16 having a target on the end thereof. After the light source has been properly aligned along the predetermined path, the target is positioned on the end of each length of pipe. When the light beam is centered on the target, the pipe length will be properly positioned and it is then fixed in place.

A grade box alignment means 30 is positioned on top of the light source to set a proper grade or dip with respect to the horizontal for the light beam.

Figure 2:
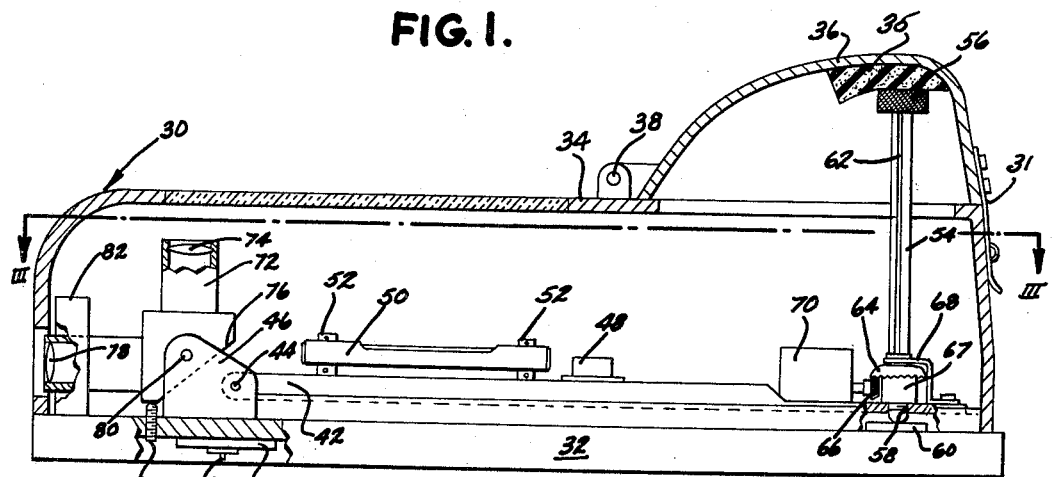
FIG. 2 is a sectional elevated view of a device which embodies the inventive concept.
Figure 3:
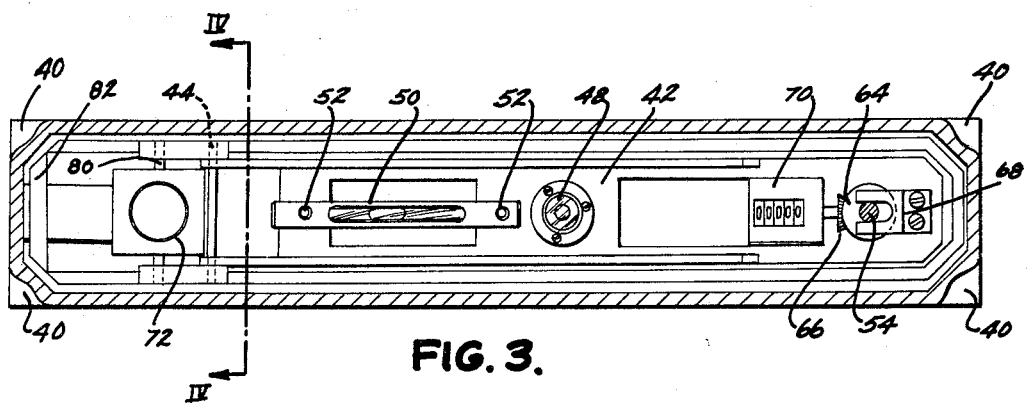
FIG. 3 is a plan view taken along lines III—III of the device shown in FIG. 2.
Figure 4:
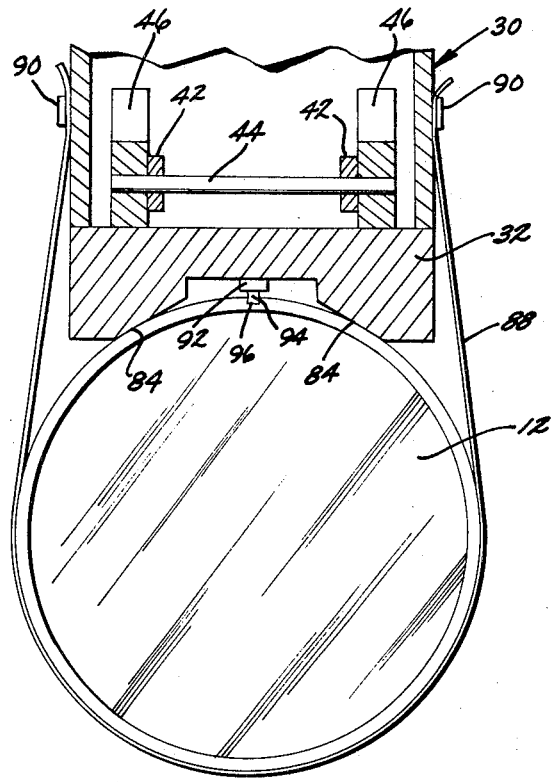
FIG. 4 is a sectional view through IV—IV of the device shown in FIGS. 2 and 3 taken along the lines IV—IV of FIG. 3.

Referring now specifically to FIGS. 2 through 4, the grade setting box 30 has a base 32, a cover 34, and a lid 36. The lid is positioned on the cover through pins 38 and the cover is fastened to base 32 through pins 40 and held in locked position by hold down snap 31. The base contains a flange 46 which rotatably supports platform 42 at one end through hinge pin 44. The platform 42 has positioned thereon level indicating means 48 and 50. The first level indicating means 48, as seen in FIG. 3, is provided to indicate the position of the hinge pin 44 and platform 42 with respect to a horizontal plane extending transversely of the axis of the laser beam. The second level indicating means 50 is attached to the platform through adjustable screws 52, and indicates the level position of a line extending longitudinally of the laser beam and passing through and perpendicular to hinge pin 44 and perpendicular to threaded rod 54. The level indicating means 50 is a much finer level than the level indicating means 48.

The platform is supported on the other end by threaded rod 54 having a knob 56. The threaded rod 54 threadably engages a boss 67 and passes through platform 42 at hole 58. The bottom portion of the rod 54 abuts against block 60 which is attached to base 32. As the threaded rod is turned by knob 56, platform 42 rotates upwardly or downwardly about pin 44 depending upon the direction of rotation of rod 54. The boss 67 is affixed to platform 42.

The threaded rod 54 is so positioned in boss 67 that the line of the rod will be perpendicular to a plane containing hinge pin 44. The plane will also contain the line whose level position is indicated by level 50.

Figure 5:
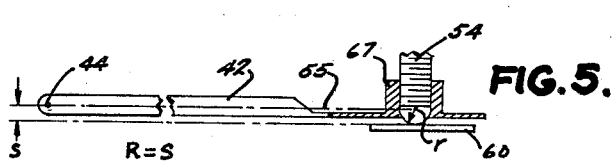
FIG. 5 is an enlarged sectional view of the adjusting rod and contact block seen in FIG. 2.

As seen best in FIG. 5, the bottom end of threaded rod 54 is rounded (preferably spherically) with the radial center of the end of the rod on a horizontal line 55 passing through the center of hinge pin 44 when level 50 is horizontal and the meter is at zero. Thus, as the platform 42 is rotated upwardly, the rod will contact the block 60 on a portion of the sphere with the center of the sphere continuously on line 55. The distance between the line passing through hinge pin 44 and perpendicular to rod 54 and the bottom of the threaded rod 54 as measured along rod 54 will always be equal to the radius $r$ of the rod plus the pitch of the threads on rod 54 times the number of revolutions turned by rod 54. It will be appreciated that if rod 54 did not have such a semispherical end, and had a square end, for example, the distance between block 60 and the initial reference point on rod 54 would increase with increasing grade. It will also be appreciated that the above can only occur when the radial center of $r$ is always maintained along line 55 and at no other place. The measurement of $r$ must equal the measurement of $s$.

Threaded rod 54 has a longitudinal groove 62 which engages a spline in gear 64. A second gear member 66 meshes with gear 64 and is operably connected to meter 70. A foam rubber pad 35 mounted on the inside of cover 36 abuts against the knob 56 to hold the entire assembly down against plate 60 and to prevent accidental turning of the rod 54. The grade of the platform with respect to base 32 is indicated by meter 70. The annular boss 67 and a bifurcated tongue 68 maintain gear 64 in the position shown in FIG. 2 with respect to the platform 42.

The grade setting device is also provided with a sighting device, preferably in the form of a right angle telescope 72 having lens 74, mirror 76, and lens 78. The telescope 72 is held by adjusting pins 80 which pass through flange 46 of the base 32 and is held by flange 82 having a central aperture for an end of the tube. The telescope preferably has cross hairs on either lens 74 and/or lens 78 to accurately position the grade setting device with respect to the laser beam and to sight a target on which the light beam is projected. The adjusting pins 80 abut against the sides of telescope 72 and can be used to align the lateral position of the telescope relative to hinge pins 44. A third adjusting pin 81 extends up through the bottom of base 32 and abuts against the bottom of the telescope 72. The adjusting pin 81 threadably engages the base 32 and is used to adjust the vertical position of the telescope 72 relative to hinge pin 44. The lens 78 remains relatively fixed in flange 82.

The base 32 has beveled surfaces at 84 to permit the device to be positioned on a cylindrical light source 12. Means such as a stretchable band 88 are provided to keep the device from being knocked off the light source 12. The band can be attached to cover 30 through snaps 90.

The base 32 has a plate 92 and a locating pin 94 beneath the central portion for positioning the device on the light source housing 12. The pin 94 is positioned within a longitudinal groove 96 in the housing (FIG. 4).

In operation, the meter is previously calibrated with the laser beam by setting it at zero relative to the line of the laser beam 15. To this end, the grade box 30 is positioned on top of the housing 12 with locating pin 94 in groove 96. The housing 12 is then rotated about its longitudinal axis until level 48 indicates that hinge pin 44 is level. The beam 15 will then be leveled using known spaced level points (not shown). The meter will be set at zero. Bifurcated tongue 68 will then be removed and gear 64 will be raised on rod 54. The rod 54 will then be rotated until level 50 is centered. At this point the line passing through and perpendicular to hinge pin 44, and perpendicular to rod 54 will be parallel to beam 15 for the particular light source housing 12. The gear 64 and the bifurcated tongue 68 can then be replaced to the position shown in FIGS. 2 and 3.

With the light beam aligned with the grade setting device, the telescope 72 can then be aligned. The light beam 15 can be impinged on a target, and pins 80 and 81 are adjusted until the target is centered within the cross hairs seen through telescope 72. The telescope 72 will then be aligned with the light beam 15.

It will be appreciated from the foregoing that the grade box 30 and light source housing 12 become cooperative parts or calibrated after they have been set in alignment. If the grade box 30 is to be used with a different light source housing, then the box must be realigned with respect to the new light source housing and its respective light beam.

When a grade is to be set on the light beam 15, the grade is merely dialed into the box 30 by turning rod 54 until the desired grade is seen on meter 70. The box is positioned on the housing 12 with locating pin 94 in groove 96. The housing is then rotated and positioned such that level 48 and level 50 are centered. The housing can then be positioned in a predetermined path with the help of transit 6 and the plumb line 7. Alternately the transit can have a sighting device in lieu of the plumb line 7. The transit is set along the plane containing the predetermined path. The transit telescope is then rotated downwardly until its line of sight is in the ditch. A target 18 is moved until it is sighted in the ditch by the telescope on the transit. The plumb line 7 is then used to position housing 12 directly below the transit. The housing 12 is then positioned so that the light beam projection on target 18 splits the cross hairs as seen through transit 6. During this movement, the levels 50 and 48 must be maintained centered. The light beam 15 will then be directed along the predetermined path.

When it is desirable to set a dip or negative grade on the light beam 15, the grade box is reversed end for end on the light source housing 12. The above described procedure is followed and the meter reads dip instead of grade. To this end, the grade box can be provided with a second right angle telescope which faces the other direction for sighting the target while setting a dip on the light beam 15.

The device can also be employed in determining the grade of a light beam directed along a path. The device will be placed upon the light source tube with the meter registered at zero. The base 32 will be aligned with the light beam by employing the telescope 72 as above described. The rod 54 will then be turned until the level indicating means 50 shows that the platform 42 is level. The grade of light beam can then be read on meter 70.

The use of the threaded rod and the gear arrangement provides an easy way of constructing the device so that the grade can be read directly by the meter. Further, the meter is linearly related to grade. This is done by selecting the proper pitch for the threads on the rod 54 and selecting the proper sizes for gears 64 and 66. As an example, if the threaded rod 54 is spaced 10 inches from pin 44, the threaded rod 54 will have 50 threads per inch and the ratio of gear 64 to gear 66 will be 2:1 to give a grade .20 ft. per hundred feet for each revolution of rod 54. Obviously, other dimensions could be employed to give the same or other desirable grade levels.

It will be appreciated from the foregoing description that the grade setting device is a precision instrument.

The rounded end on the threaded rod and the use of the meter allow the grade to be set accurately to .01 feet/100 ft. Further, the device will produce a positive or negative grade by merely repositioning or turning the housing around on the light projector.

Whereas the grade box has been specifically described with reference to aligning light beams or laser beams for aligning sewer pipes, it is obvious that the inventive device can be used for many other purposes as setting grade on concrete forms or aligning light beams for entirely different purposes.

Reasonable variation and modification are possible within the scope of the foregoing disclosure of this invention without departing from the spirit thereof.

The embodiments of the invention in which an exclusive property or privilege is claimed are defined as follows.

1. A grade setting device comprising:
a housing;
reference base means beneath said housing defining a base plane for positioning said housing on an article to be graded with said grade setting device;
a platform attached at one end to said housing and pivotable about an axis at said end with respect to said housing;
a level indicating means on said platform to indicate the horizontal position of a line on said platform perpendicular to said axis;
means on another end of said platform for linearly adjusting the position of said platform relative to said housing including an adjustable rod having a rounded end;
meter means associated with said rod to indicate the position of said platform relative to said base plane;
said meter means having a zero point when a line perpendicular to said axis and to said rod is parallel to said base plane of said housing;
a contacting surface for said rod in said housing beneath said platform for supporting said rounded end of said rod; and
the distance between said contacting surface and said line parallel to said base plane being substantially equal to the radius of curvature of said rounded end of said rod whereby the accuracy of the grade set by said device is linearly constant regardless of the extent of said grade.

2. A grade setting device according to claim 1 wherein a sighting means is attached to said housing to view a target to facilitate proper positioning of a collimated light source.

3. A grade setting device according to claim 2 wherein said sighting means includes a right angle telescope facing upwardly so that a target can be sighted by looking downwardly into the device.

4. A grade setting device according to claim 3 wherein said telescope is held with adjustable means to said housing so that said telescope can be adjusted to be aligned with a light beam from a housing on which said device is positioned.

5. A grade setting device according to claim 1 wherein said housing includes means for positioning said device on a collimated light source housing such that said device can be positioned in the same place relative to the collimated light from said housing.

6. A grade setting device according to claim 1 wherein said level indicating means includes a level to indicate the horizontal position of said axis in a horizontal plane and a fine level indicating means to show the relationship of a line passing through said axis and perpendicular to said adjusting rod to a horizontal plane.

7. A grade setting device according to claim 1 wherein said adjusting means includes a vertically extending rod threadably engaging said platform and extending therethrough and abutting against a portion of said housing below said platform.

8. A grade setting device according to claim 7 wherein said rod drives a gear means which rotates with said rod, said gear means being operably connected with said meter means which indicates the grade of a collimated light beam from said light source with respect to a horizontal plane whereby said meter reading is linearly related to grade.

9. A grade setting device according to claim 8 wherein said gear means comprises a first gear member which is slidably positioned and keyed to said rod, and a second gear member which engages a first gear member and is operably connected to said meter means.

10. In combination
a grade setting device comprising: a housing; a platform attached at one end to said housing and pivotable about an axis at said end with respect to said housing; a level indicating means on said platform to indicate the horizontal position of a line perpendicular to said axis; a means for adjusting the position of said platform relative to said housing;
a collimated light source having a cylindrical exterior container;
means on said housing for positioning said device on said collimated light source container;
means on said exterior container and on said housing for aligning said housing on said container in a given position relative to a collimated light beam from said light source to avoid realigning said grade setting device with said collimated light source each time said grade setting device is removed from and replaced on said cylindrical container.

11. The combination according to claim 10 wherein said housing contains an adjustable sighting means which can be aligned with said collimated light beam.

12. The combination according to claim 10 wherein said light source is a laser beam generating device and said collimated light beam is a laser beam.

13. The combination according to claim 10 wherein said level indicating means includes a level to indicate the horizontal position of said axis in a horizontal plane and a fine level indicating means to show the relationship of a line passing through said axis and perpendicular to said adjusting rod to a horizontal plane.

14. The combination of claim 10 wherein the housing has a reference base means located on a plane and defining a base plane, said platform being pivotal with relation to said base plane in such a position that a line drawn through the said axis and the center of radius of said rounded end of said adjusting rod is parallel to said base plane.

15. The device of claim 10 in which the said housing can be mounted on said light source in either of two directions whereby means are provided for setting either a positive or negative grade.

16. The combination of claim 10 wherein said aligning means comprises a longitudinal groove formed in said cylindrical exterior container, and a pin on the bottom of said housing projecting into said groove.

17. In combination
a grade setting device comprising: a housing, a platform attached at one end to said housing and pivotable about an axis at said end with respect to said housing; a level indicating means on said platform to indicate the horizontal position of a line perpendicular to said axis; a means for adjusting the position of said platform relative to said housing;
a collimated light source having an exterior container with first and second positioning means;
third and fourth positioning means on said housing for cooperating with said exterior container first and second positioning means such that said housing is in a predetermined position with respect to said light source when said first and second positioning means are in contact with said third and fourth positioning means respectively; and means forcing said first and second positioning means in contact with said third and fourth positioning means respectively, whereby realigning of said grade setting device with said collimated light source is avoided each time said grade setting device is removed from and replaced on said container.

References Cited

UNITED STATES PATENTS

| | | | |
|---|---|---|---|
| 534,993 | 3/1895 | Buford | 33—68 |
| 1,660,833 | 2/1928 | Cronjaeger. | |
| 1,805,004 | 5/1931 | Newsome. | |
| 2,198,836 | 4/1940 | Patton. | |
| 3,116,557 | 1/1964 | Trice. | |
| 3,279,070 | 10/1966 | Blount et al. | |

SAMUEL S. MATTHEWS, Primary Examiner